No. 652,513. Patented June 26, 1900.
G. J. FRIEND.
WEED DESTROYER AND CULTIVATOR.
(Application filed Feb. 8, 1900.)
(No Model.) 2 Sheets—Sheet 1.
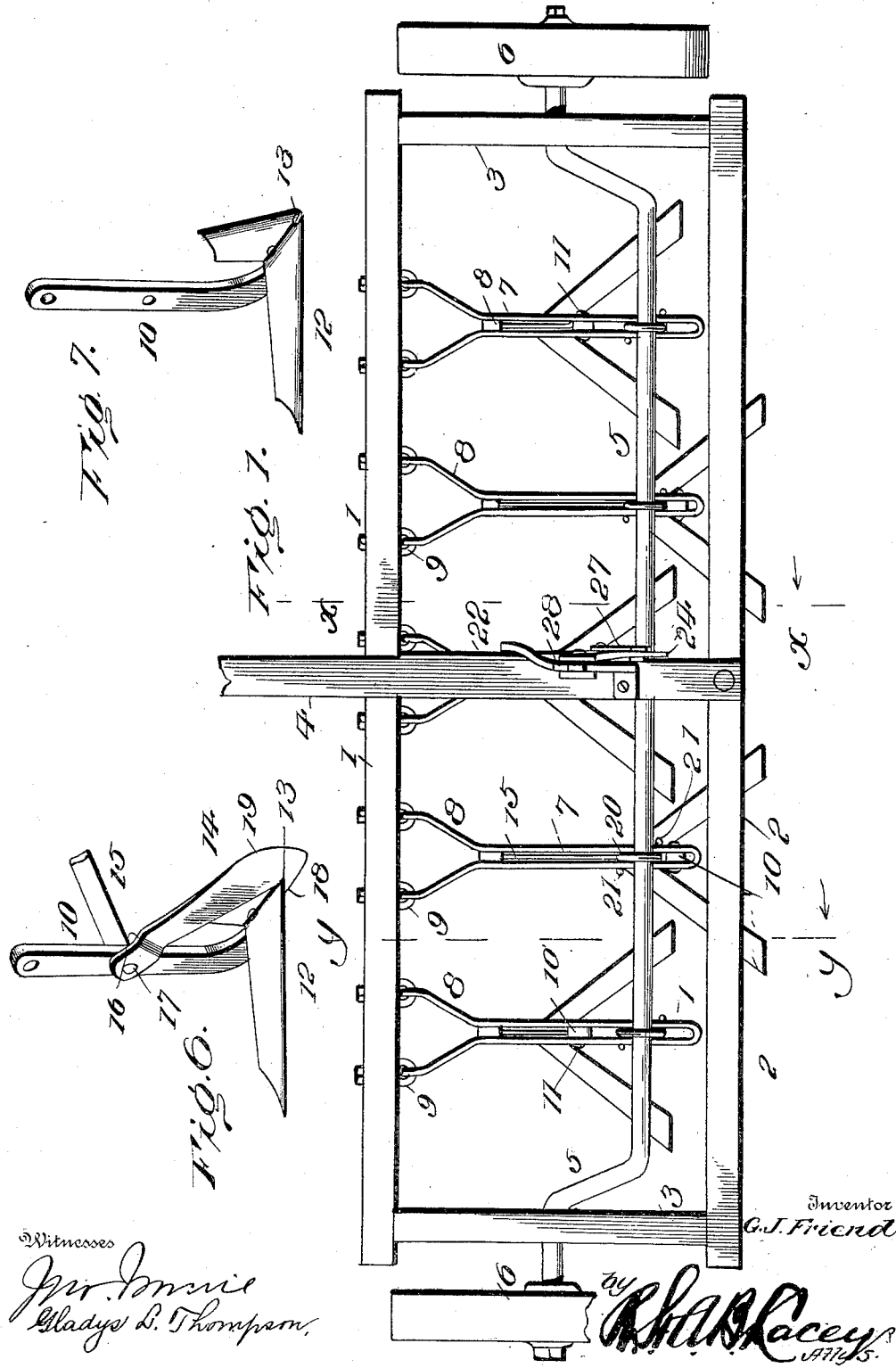

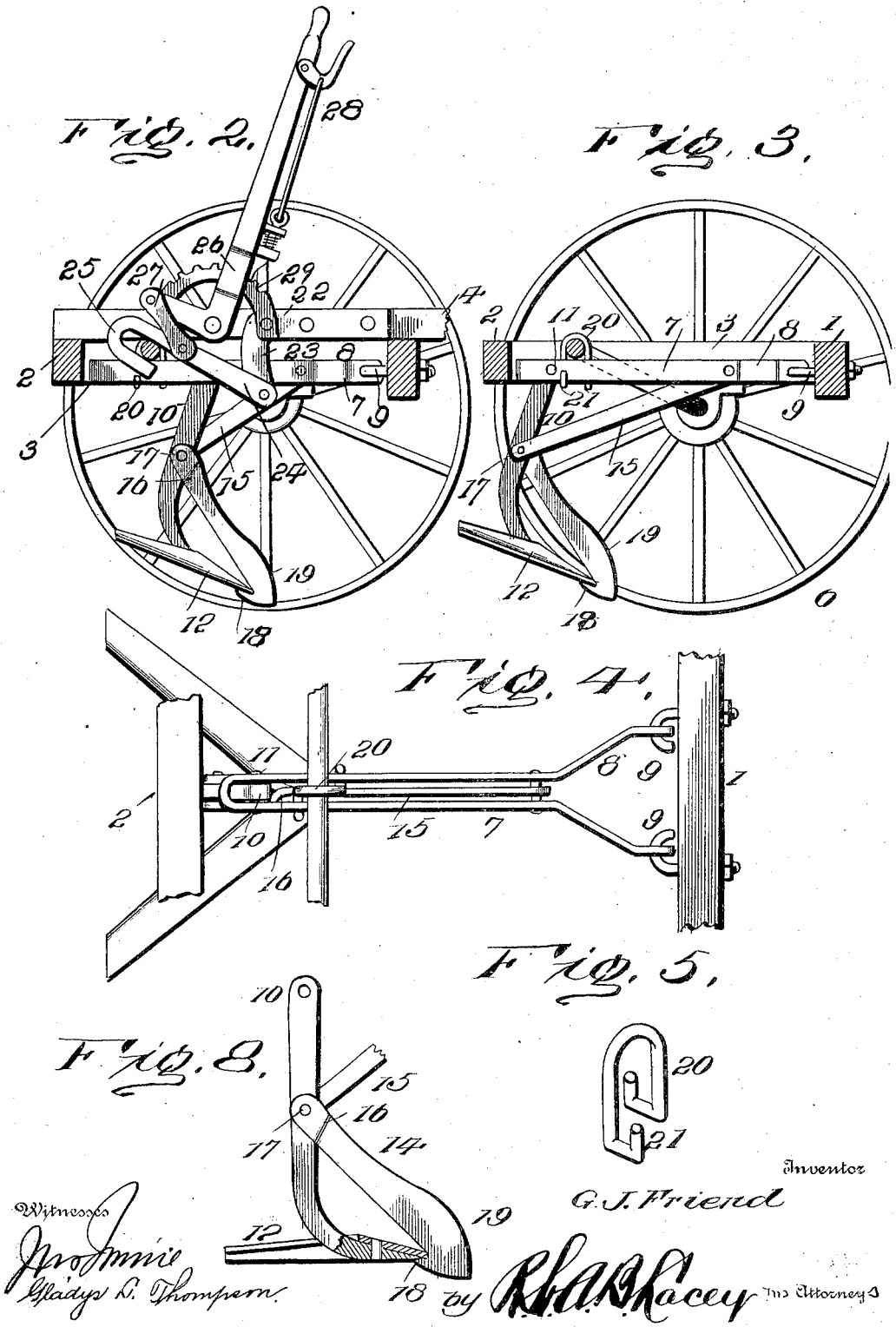

UNITED STATES PATENT OFFICE.

GEORGE J. FRIEND, OF KINGSLEY, OREGON.

WEED-DESTROYER AND CULTIVATOR.

SPECIFICATION forming part of Letters Patent No. 652,513, dated June 26, 1900.

Application filed February 8, 1900. Serial No. 4,527. (No model.)

*To all whom it may concern:*

Be it known that I, GEORGE J. FRIEND, a citizen of the United States, residing at Kingsley, in the county of Wasco and State of Oregon, have invented certain new and useful Improvements in Weed-Destroyers and Cultivators; and I do hereby declare the following to be a full, clear, and exact description of the invention, such as will enable others skilled in the art to which it appertains to make and use the same.

This invention relates to agricultural machinery principally designed for preparing the soil to receive the seed. In its specific application the implement is intended chiefly as a summer fallow-weed destroyer.

The improvement consists of an implement which is adjustable and under the control of the driver and which can be regulated to run deep or shallow, as desired, and which may be thrown out of action without necessitating the stopping of the team or the dismounting of the driver.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a top plan view of an implement specially designed for attaining the objects of the invention. Fig. 2 is a longitudinal section on the line X X of Fig. 1 looking in the direction of the arrow and showing the adjusting instrumentalities. Fig. 3 is a section on the line Y Y of Fig. 1 looking in the direction of the arrow. Fig. 4 is a detail top plan view of a plow or cultivator shovel and its mountings. Fig. 5 is a perspective view of a hanger. Fig. 6 is a perspective view of a plow and colter. Fig. 7 is a perspective view of the parts shown in Fig. 6, the colter being detached. Fig. 8 is a side elevation of the plow and colter, the near share or wing being in section.

Corresponding and like parts are referred to in the following description and in all the views of the drawings by the same reference characters.

The frame is of oblong and rectangular shape and may be of any transverse extent corresponding with the tract to be covered by the implement in one travel over the field. The frame consists of the front beam 1, rear beam 2, and end or side beams 3, the several beams being rigidly attached at their meeting ends. The pole or tongue 4 is centrally disposed with reference to the frame and is rigidly attached to the front and rear beams 1 and 2. The axle 5 is of the crank type and is mounted in bearings applied to the end beams 3, the projecting terminals of the axle receiving the ground-wheel 6 and the intermediate portion the cultivating or earth-treating devices.

The individual plows, cultivators, or earth-treating devices are of duplicate construction. Hence a detailed description of one only will be given. The beam comprises parallel members 7, having their forward ends divergent, as shown at 8, and pivotally connected to the front beam 1 by means of hook or eye bolts 9. In the preferable construction the beam is formed of a single bar, which is folded or doubled upon itself at its central point. The standard 10 has its upper end fitted between the members 7 and secured thereto by means of a bolt 11 or analogous fastenings, the lower end of the standard being forwardly curved and expanded, so as to provide a seat for the plow or cultivator-shovel 12, which is secured thereto. This plow or cultivator-shovel 12 is of the double-winged type and is secured at a central point to the standard 10, the point having a notch or open-ended slot 13 to receive the lower end of the colter 14. A brace 15 connects the standard 10 with the beam, the upper end of the base being secured between the members 7 in a similar manner to the standard 10.

The colter 14 is disposed in advance of the standard 10 and directly above the foot and curves upwardly and rearwardly from its lower front end and is attached to a side of the standard, the upper attaching end being offset, as shown at 16, and secured to the standard by the same bolt or fastening 17 employed for attaching the lower end of the brace 15 thereto. The lower forward end of the colter projects below the plane of the plow or cultivator-shovel 12 and has an extension 18 to underlap the shovel and the front end of the expanded end of the standard 10. The lower edge of the colter is made rounding to ride over the ground more easily, and the portion directly above the point of the plow 12 is formed into a hump 19, which performs the greater part of the work.

The plow-beams, as previously stated, have loose or pivotal connection with the front beam 1 of the frame, and they likewise have loose connection with the intermediate portion of the axle 5 at a point in the rear of its axial line. The connection between the plow-beams and the axle 5 is effected by means of hangers 20, which are in the form of yokes or staples having the lower ends of their side members bent in opposite directions, as indicated at 21. The hangers 20 straddle the axle 5 and pass between the members 7 of the plow-beams, and their bent ends 21 engage with the said members 7 and hold the plow-beams and axle in the desired position. Inasmuch as the center of movement of the axle 5 is intermediate of the front and rear supports of the plow-beams it is necessary that the connection between the rear ends of said plow-beams and the axle be movable in order to allow for the turning of the axle 5 when raising and lowering the plows or cultivator-shovels. The plows or cultivators have a staggered arrangement in order to admit of the wings of adjacent plows overlapping, whereby spaces or untouched portions of the soil between the rows formed by adjacent plows are wholly obviated. Certain of the plows are arranged in advance of the intermediate portion of the axle 5 and other plows are disposed in the rear of said axle. The intermediate plows are connected with their beams in advance of the axle, whereas the alternate plows have attachment with their beams at a point in the rear of said axle. This disposition of the plows results in the staggered arrangement referred to and enables the attainment of the end stated.

The turning of the axle causes the intermediate portion to rise and fall with reference to the plane of the frame and effects a corresponding movement of the plows or cultivators to cause them to run deep or shallow, as required. The following means are provided for moving the axle, and consist of a plate 22, secured to a side of the pole or tongue 4 and having a pendent portion 23, to which a bar 24 is pivotally connected, said bar extending rearwardly and terminating in a hook 25, which embraces the middle portion of the axle. An elbow-shaped lever 26 is fulcrumed to the pole 4, and the rear end of its horizontal arm is connected by links 27 with the pivoted bar 24, and said lever has the ordinary hand-latch 28 applied thereto and adapted for coöperation with a notched segment 29, secured to the pole 4 for holding the parts in an adjusted position.

When the implement is drawn over the field for destroying weeds or for cultivating purposes, the lever 26 can be moved to raise or lower the plows to cause them to enter the soil to the requisite depth or to throw them entirely out of action.

The term "earth-treating devices" includes the plows or cultivator-shovels 12 and their supporting means, as the standards 10, and in the claims when the term "earth-treating devices" is employed in connection with the beams it is to be construed as referring to and including the cultivator-shovels and standards.

Having thus described the invention, what is claimed as new, and desired to be secured by Letters Patent, is—

1. In combination, a gang of earth-treating devices pivotally supported at one end, an axle having crank portions mounted in bearings located intermediate of the main portion of the axle and the pivotal supports of the said earth-treating devices, sliding connections between the intermediate or main portion of the axle and the swing ends of the earth-treating devices, and means for turning the axle to effect the raising or lowering of the earth-treating devices and hold them in an adjusted position, substantially as set forth.

2. In combination, a frame, beams bearing earth-treating devices and having pivotal connection at their front ends with the said frame, a crank-axle having its crank portion mounted in bearings applied to the frame, hangers applied to the intermediate portion of the axle and having slidable connection with the rear ends of the aforesaid beams, and means for turning the axle to effect a raising and lowering of the earth-treating devices, substantially as set forth.

3. In combination, a frame, a series of beams having pivotal connection at their foot ends with the frame, a crank-axle having its crank portions mounted in bearings of the frame, loose connections between the intermediate portion of the axle and the rear ends of the aforesaid beams, means for raising and lowering the rear ends of the beams, and earth-treating devices secured to said beams, the intermediate earth-treating devices having attachment with the beams in advance of the axle and the alternate earth-treating devices having connection with their beams in the rear of said axle, substantially as set forth.

4. In combination, a plow or cultivator-shovel secured to the standard and having a notch or open slot at its point, and a colter secured at its open end to the standard and having its lower end fitted into the said notch or slot of the shovel and having a rear extension underlapping the plow-point and lower portion of the standard, substantially as described.

5. In combination, a pivotally-supported plow-beam comprising parallel or spaced members, a crank-axle, means for turning the crank-axle in its bearings and holding it in an adjusted position, and a hanger of approximately U form mounted upon the axle and passing between the members of the plow-beam and having the terminal portions of its side members bent in opposite directions to engage with the members of the plow-beam substantially as set forth.

6. In combination, a frame, a series of beams comprising parallel members having their forward ends divergent and pivotally connected to the front beam of the frame, plow-standards arranged alternately in front of and in the rear of said axle and connected with the respective beams, hangers applied to the axle and having slidable connection with the rear ends of the pivoted beams, an operating-lever, and a hooked bar having connection with said lever and with the intermediate portion of the axle, substantially as specified.

In testimony whereof I affix my signature in presence of two witnesses.

GEORGE J. FRIEND. [L. S.]

Witnesses:
   E. MAYHEW,
   P. A. CROSS.